United States Patent
Hansen

(10) Patent No.: US 6,974,292 B2
(45) Date of Patent: Dec. 13, 2005

(54) ONE-PIECE REUSABLE PLASTIC FASTENER

(75) Inventor: Wayne M. Hansen, Chippewa Falls, WI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 10/696,960

(22) Filed: Oct. 30, 2003

(65) Prior Publication Data

US 2005/0095084 A1    May 5, 2005

(51) Int. Cl.[7] .......................................... F16B 19/00
(52) U.S. Cl. ...................... 411/508; 411/509; 24/458
(58) Field of Search .................. 24/458, 295; 411/508, 411/509

(56) References Cited

U.S. PATENT DOCUMENTS

| | | | |
|---|---|---|---|
| 3,177,540 A * | 4/1965 | Hall et al. .................. | 411/508 |
| 3,485,133 A * | 12/1969 | Rapata ....................... | 411/508 |
| 3,678,797 A * | 7/1972 | Seckerson .................. | 411/509 |
| 3,745,612 A * | 7/1973 | Seckerson .................. | 411/509 |
| 4,668,145 A * | 5/1987 | Hirohata ..................... | 411/508 |
| 4,981,310 A * | 1/1991 | Belisaire ................... | 285/140.1 |
| 5,573,362 A * | 11/1996 | Asami et al. ............... | 411/509 |
| 6,141,837 A * | 11/2000 | Wisniewski .................. | 24/295 |
| 6,317,937 B1 * | 11/2001 | Ishihara et al. .............. | 24/297 |
| 6,353,981 B1 * | 3/2002 | Smith ......................... | 24/295 |
| 6,572,317 B2 * | 6/2003 | Okada et al. ............... | 411/508 |
| 6,575,986 B2 * | 6/2003 | Overaker .................... | 606/151 |
| 6,874,983 B2 * | 4/2005 | Moerke et al. .............. | 411/46 |
| 2005/0079033 A1 * | 4/2005 | Benedetti et al. ........... | 411/508 |

* cited by examiner

*Primary Examiner*—Katherine Mitchell
(74) *Attorney, Agent, or Firm*—Mark W. Croll; Paul F. Donovan

(57) ABSTRACT

A reusable plastic fastener has an elongated shank having two flexible curved flanges secured thereto and a head secured to a central portion of the shank. The flanges are secured at a leading edge to the central portion and curve away to terminate in a trailing edge that is unsupported between a distal end and a base of the central portion. A top edge of each of the flanges is secured to the head of the fastener by a tab. The exterior of the flexible flanges extends outwardly away from the central portion beginning at the distal end of the central portion and is angled back in towards the central portion near the base of the central portion so as to form a shoulder between the flexible flanges and the head of the fastener. The central portion of the shank has at least one cored-out section.

11 Claims, 1 Drawing Sheet

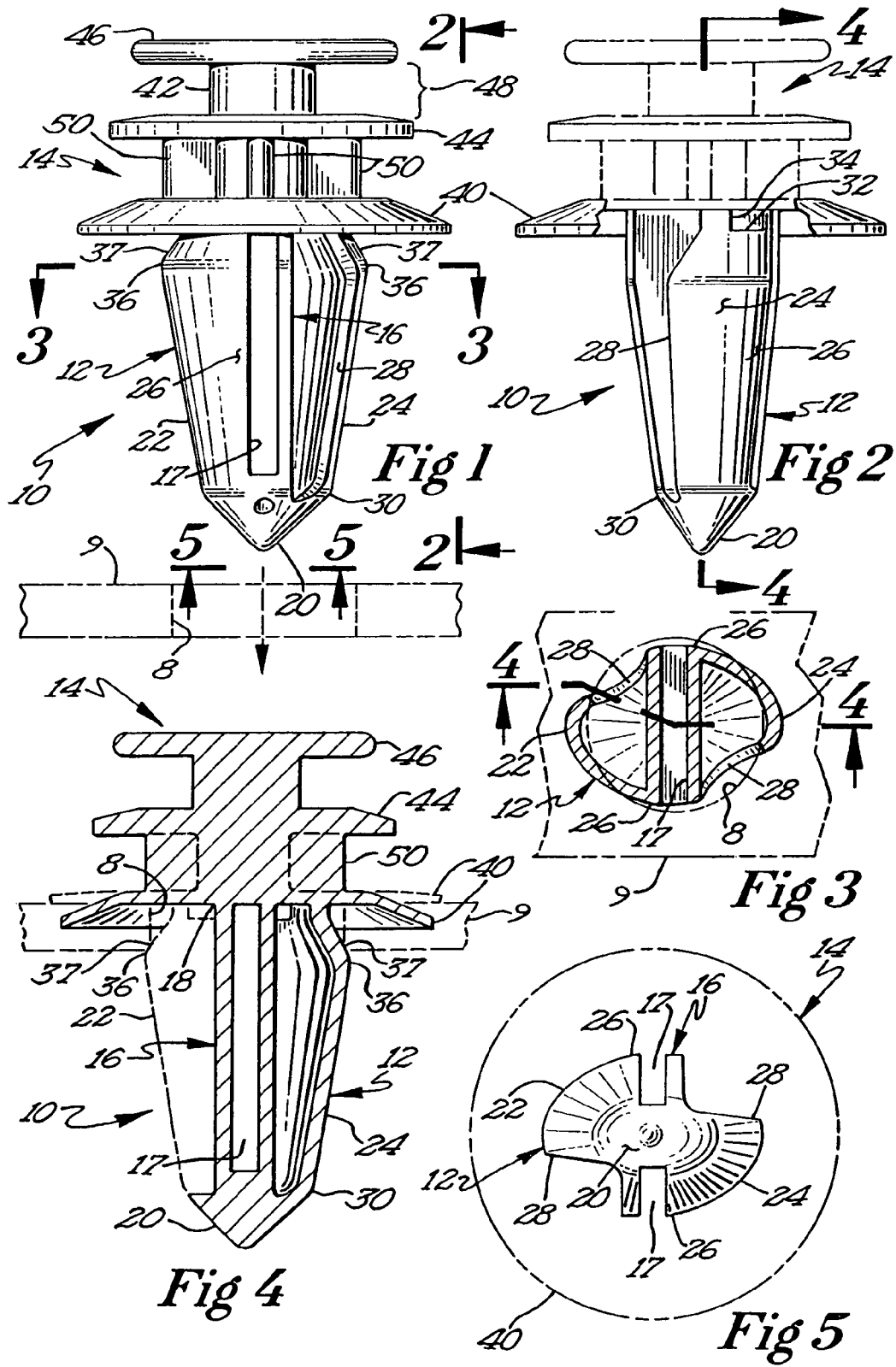

US 6,974,292 B2

ONE-PIECE REUSABLE PLASTIC FASTENER

FIELD OF THE INVENTION

The present invention relates to plastic fasteners for securing objects to a framework such as the sheet metal frame or body of an automobile.

BACKGROUND OF THE INVENTION

Plastic fasteners enjoy widespread use in the automotive industries and in other industries in applications where an object must be secured to a relatively thin substrate such as the sheet metal frame or body of an automobile. An ideal plastic fastener can be inserted into a bore formed through a substrate relatively easy but is difficult to withdraw.

Unfortunately, one characteristic of plastic fasteners of this type is that because the fasteners themselves are fashioned of relatively flexible materials, fasteners that are easy to insert into a bore formed through a substrate tend to be relatively easy to remove from the substrate. Similarly, where a fastener is difficult to remove from a substrate, it is generally correspondingly difficult to insert that fastener into the bore formed through the substrate. Accordingly, there is a need for a reusable plastic fastener that may be easily inserted into a bore formed through a substrate, yet is difficult to remove from the substrate. In addition, it is desirable to provide a fastener that may be reused so that fasteners need not be replaced each time they are disassembled. This former need is particularly useful considering that in the manufacture of an object such as an automobile, a component being attached to an automobile frame or body may need to be removed temporarily for repair or adjustment.

U.S. Pat. No. 6,305,055 to Castro, hereby incorporated by reference, is intended to meet the aforementioned needs by providing a plastic fastener having a shaft with two curved, flexible flanges secured thereto that flex inwardly as the shaft of the fastener is forced into a bore formed through a substrate. The flanges resist withdrawal once the fastener had been fully inserted into the bore. While the fastener described in the '055 patent performs admirably, the ratio of the force required to insert the fastener into a bore to the force required to withdraw the fastener from the bore is not ideal. Accordingly, the present invention provides a fastener having an improved insertion to withdrawal force ratio and which is constructed so as to be easily reused after disassembly.

SUMMARY OF THE INVENTION

The objects of the present invention are realized in a fastener having a head, a shank with a cored-out section, and a pair of flexible flanges secured to and between the shank and to the head of the fastener.

The head of the fastener is secured to the shank of the fastener in a generally perpendicular relation thereto. The shank has a central portion with a distal end and a base end. The head is connected to the base end of the shank. The pair of flexible flanges is secured at their leading edge to the central portion of the shank on opposing sides of the shank and preferably in diagonal opposition to one another. The flanges curve away from the central portion of the shank and the trailing edges of each flange are generally unsupported between the distal end of the shank and the base end of the shank. In a preferred embodiment, a top portion of the trailing edge of each of the flanges is secured to the head of the fastener by a tab that extends between the flange and the head of the fastener. The flanges define a shoulder adjacent to the base end of the shank that opposes the head of the fastener so as to define an aperture therebetween for receiving and retaining a panel therebetween.

A cored-out section formed into the central portion of the shank is deformed inwardly as the shank of the fastener is inserted into a bore formed through a panel. This deformation is created by inwardly directed forces applied to the flanges as the fastener is inserted into a bore in a substrate. The deformation of the cored-out section lowers the force required to insert the fastener into the bore formed through the substrate.

A preferred embodiment of the head of the fastener includes a laterally extending lip or flange that is biased toward the shank of the fastener, though it is to be understood that the head may be made up of a lip or flange that is perpendicular to or biased away from the shank of the fastener, as the case may be. In addition, the head of the fastener may include structures for securing the fastener to another object or structure such as a doghouse connector in addition to or in lieu of a lip or flange.

DESCRIPTION OF THE DRAWINGS

FIG. 1 is a front elevation of a preferred embodiment of a fastener of the present invention shown adjacent to a bore formed through a substrate;

FIG. 2 is a side elevation of a fastener of FIG. 1;

FIG. 3 is a cross-sectional view of a fastener of the present invention taken along cutting lines 3—3 in FIG. 1;

FIG. 4 is a cross-sectional view of the fastener taken along cutting lines 4—4 in FIG. 3; and, FIG. 5 is a bottom view of the fastener of the present invention.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

FIGS. 1 and 2 show a front and a side view, respectively, of a fastener 10 constructed and arranged according to the principals of the present invention. Fastener 10 generally comprises a shank 12 that extends downwardly and generally perpendicularly to a head 14. The head 14 of the fastener 10 is illustrated in FIG. 2 in phantom lines to indicate that the head 14 may take many configurations and is not limited to the preferred embodiment illustrated most clearly in FIG. 1.

The shank 12 of the fastener 10 has a central structure 16 that extends the entire length of the shank 12. At a base end 18, the central structure 16 is connected to the head 14 of the fastener 10. A distal end 20 of the central structure 16 terminates in a generally pointed tip that eases the entry of the shank 12 into a bore 8 formed through a substrate 9 as shown most clearly in FIG. 1. Attached to the central structure 16 is a pair of curved, flexible flanges 22 and 24. The flanges 22, 24 together comprise a retaining mechanism that acts to retain the shank 12 of the fastener 10 within a bore 8 of a substrate 9.

As can best be seen in FIG. 3, each of the flanges 22, 24 are secured at a leading edge 26 thereof to the central structure 16. Each of the flanges 22, 24 extends away from the central structure 16 and curves in relation thereto, having a generally elliptical cross-sectional shape. Note that the cross-sectional shape of the flanges 22, 24 may take on any useful geometry and can be uniform over the entire height of the flanges 22, 24 or may vary over the height of the flanges 22, 24.

A bottom edge 30 of the flanges 22, 24 is secured to the central structure 16 at the distal end 20 of the shank 12. The trailing edges 28 of the flanges 22, 24 are generally unsupported and extend from the distal end 20 of the shank 16 upwardly toward the base end 18 of the shank. A top edge 32 of the flanges 22, 24 is preferably secured to the head 14 of the fastener 10 by a tab 34, though the tabs 34 may be omitted where the application of the fastener 10 so dictates. The unsupported trailing edge 28 of the flanges 22, 24 increases the generally flexibility of the flanges 22, 24, and decreases the magnitude of the force required to insert the fastener 10 into a bore 8 formed through a substrate 9. Tabs 34 fix the position of the top edge 32 of the flanges 22, 24 with respect to the central structure 16 of the shank 12 and increase the rigidity of the flanges 22, 24 near the top edge 32 of the flanges 22, 24 while permitting the remaining portions of the flanges 22, 24 to be relatively flexible.

Each of the flanges 22, 24 extends generally outwardly from the central structure 16 of the shank 12 from the distal end thereof. Keeping in mind that the cross-sectional shape of the flanges 22, 24 may be circular, elliptical, or irregularly shaped, the exterior surface generally established by the flanges 22, 24 is roughly frustoconical in shape. The flanges 22, 24 together define a ridge 36 that itself defines a shoulder 37 that opposes the head 14 of the fastener 10.

As can best be seen in FIG. 4, the flanges 22, 24 act to retain the shank 12 of the fastener 10 within a bore 8 formed through a substrate 9. The flanges 22, 24 are constructed and arranged such that when the fastener 10 is fully inserted in the bore 8, the head 14 and shoulder 37 of flanges 22, 24 will abut opposing sides of the substrate 9 so as to secure the fastener 10 within the bore 8. As can be appreciated, the flexibility of the flanges 22, 24 is directly related to the magnitude of force required to insert the fastener 10 into the bore 8. As the top edges 32 of the flanges 22, 24 are secured to the head 14 by means of tab 34, the rigidity of the flanges 22, 24 at ridge 36 is increased. Accordingly, the tab 34 is very useful in increasing the withdrawal force required to remove the fastener 10 from the bore 8 of the substrate 9.

In order to ensure that the required insertion force remains relatively low, the central structure 16 has been provided with a cored-out section 17. In a preferred embodiment of the fastener 10, cored-out section 17 passes entirely through the central structure 16 over substantially all of its height though is to be understood that the cored-out section 17 may extend over only a portion of the height of the central structure 16 and/or may be formed only partially into the depth of the central structure 16. In any case, the cored-out section 17 increases the flexibility of the central srtucture of the shank 12 so as to reduce the magnitude of the insertion force required to seat the fastener 10 within the bore 8. As the shank 12 is inserted into the bore 8, the inwardly directed forces applied to the flanges 22, 24 are at least partially transmitted to the central structure 16 which is deflected or deferred into this cored-out section 17.

Because the flexibility, and hence the deformability, of the shank 12 is increased primarily in its central portion midway between the distal end 20 and the base 18, the provision of the cored-out section 17 through the central structure 16 does not significantly reduce the rigidity of the flanges 22, 24 where they are secured by tab 34 to the head 14. Accordingly, the withdrawal force is higher relative to the insertion force required to seat the fastener 10 within the bore 8.

As indicated above, the head 14 of the fastener 10 may take any useful configuration. In one embodiment, the head 14, may have a structure, such as flange 40 that is wide enough with respect to the dimensions of the bore 8 formed through the substrate 9 so as to prevent the fastener 10 from passing entirely therethrough. As can best be seen in FIG. 4, the flange 40 abuts a first side of the substrate 9 whereas the shoulder 37 of flanges 22, 24 abuts the second side of the substrate 9 so as to oppose one another and retain the fastener 10 in the bore 8 formed through the substrate 9. The flange 40 in a preferred embodiment of the present invention is biased downwardly toward the shank 12 of the fastener 10 so as to create a resilient seal against the substrate 9 when the fastener 10 is received within the bore 8 and to prevent unwanted movement in the fastener 10 once it has been installed. Alternatively, the flange 40 may be flat or even biased away from the shank 12. In any case, the distance between the flange 40 and the ridge 36 defined by the flanges 22, 24 is generally related to the thickness of the substrate 9 and is arranged so as to permit the flange 40 and the ridge 36 to engage the opposing sides of the substrate 9 so as to secure the fastener 10 within the bore 8.

While the flange 40 is preferably larger than the bore 8 formed through a substrate 9, the flange 40 may be reduced in size or omitted altogether where the head 14 is otherwise constructed and arranged such that it cannot pass through the bore 8. One example of such a head 14 (not shown) involves providing a structure for mechanically or adhesively securing the head 14 to another structure so as to prevent the fastener 10 from passing through the bore 8.

A preferred embodiment of the head 14 illustrated in FIG. 1 includes a post 42 that extends upwardly away from the flange 40 and which has mounted thereon a pair of subflanges 44, 46. The subflanges 44, 46 are spaced apart upon post 42 so as to create an aperture 48 therebetween. The aperture 48 is sized so that the post 42 may be received within a slot formed in a structure such as a "doghouse", a standard attachment structure for molded items (not shown). Post 42 is retained in the slot in the object preferably by a snap-in type force fit engagement. In order to ensure that the post 42 is not deformed when it is received into a slot formed in an object, reinforcement vanes 50 may be formed between the subflange 44 and the flange 40 so as to increase the rigidity of the post 42.

Removal of the fastener 10 from a bore 8 is effected by applying a withdrawal force to the fastener 10 such that the rigidity of the flanges 22, 24 at their shoulders 37 is overcome and the flanges 22, 24 are deflected inwardly to a sufficient degree to allow the fastener 10 to be removed from the bore 8. While the flanges 22, 24 are fairly rigid near the shoulder 37, the overall flexibility of the flanges 22, 24 away from the shoulders 37 and the flexibility imparted to the shank 12 by the cored-out section 17 minimize damage to the fastener 10 upon disassembly, thereby allowing for reuse of the undamaged fasteners 10.

While the foregoing written description of the invention enables one of ordinary skill to make and use what is considered presently to be the best mode thereof, those of ordinary skill will understand and appreciate the existence of variations, combinations and equivalents of the specific exemplary embodiments herein. The invention is therefore to be limited not by the exemplary embodiments herein, but by all embodiments within the scope and spirit of the appended claims.

What is claimed is:

1. A fastener comprising:

a shank having a central structure with a distal end and a base end and a pair of curved, flexible flanges secured at a leading edge thereof to the central structure of the shank on opposing aides thereof, each of the flanges curving away from the central structure of the shank, a trailing edge of each flange extending generally unsupported between the distal end of the shank and the base end of the shank, each of the flanges defining a shoulder adjacent the base end of the shank;

a head secured to the base end of the central structure of the shank in generally perpendicular relation thereto, a top portion of the trailing edge of each of the respective flanges being fixedly secured to the head of the faster by a tab that extends between and fixedly interconnects the flange and the head of the fastener, the head and the flanges of the fastener being constructed and arranged for receiving and retaining a panel therebetween; and a cored-out section formed into the central structure of the shank such that as the shank of the fastener is inserted into a bore formed through the panel, inwardly directed forces applied to the flanges are transmitted from the flanges to the central structure of the shank which then deforms Into the cored-out section thereof so as to lower the force required to insert the fastener into the bore formed through the panel.

2. A fastener comprising:

a shank having a central structure with a distal end and a base end and a pair of curved, flexible flanges secured at a leading edge thereof to the central structure of the shank on opposing sides thereof, each of the flanges carving away from the central structure of the shank, a trailing edge of each flange extending generally unsupported between the distal end of the shank and the base end of the shank, each of the flanges defining a shoulder adjacent the base end of the shank;

a head secured to the base end of the central structure of the shank, the head and the flanges being constructed and arranged for receiving and retaining a panel therebetween, such that a top portion of the trailing edge of each of the respective flanges is fixedly secured to the head of the fastener by a tab that extends between and directly interconnects the head of the fastener and each flange adjacent its shoulder; and a cored-out section formed into the central structure of the shank such that as the shank of the fastener is inserted into a bore formed through the panel, inwardly directed forces applied to the flanges are transmitted from the flanges to the central structure of the shank which then deforms toward the cored-out section thereof so as to lower the force required to insert the fastener into the bore formed through the panel.

3. The fastener of claim 2 wherein the head comprises at least one flange secured to the base end of the central structure of the shank in generally perpendicular relation thereto.

4. The fastener of claim 2 wherein the head of the fastener comprises a laterally extending lip that is biased toward the shank of the fastener.

5. The fastener of claim 2 wherein the head comprises a connecting structure constructed and arranged to be removably received and retained in a doghouse.

6. The fastener of claim 5 wherein the head of the fastener also comprises a laterally extending lip that is biased toward the shank of the fastener.

7. A fastener comprising:

a shank having a central structure with a distal end and a base end and a pair of curved, flexible flanges secured at a leading edge thereof to the central structure of the shank on opposing sides thereof, each of the flanges curving away from the central structure of the shank, a trailing edge of each flange extending generally unsupported between the distal end of to shank and the base end of the shank, each of the flanges defining a shoulder adjacent the base end of the shank;

a head secured to the base end of die central structure of the shank in generally perpendicular relation thereto, a top structure of the trailing edge of each of the respective flanges being secured fixedly to the head of the fastener by a tab that extends between and directly interconnects the flange and the head of the fastener, the head and the flanges of the fastener being constructed and arranged for receiving and retaining a panel therebetween; and a cored-out section formed into the central structure of the shank between the flanges, a hollow section being formed between said central structure and said flanges such that as the shank of the fastener is inserted into a bore formed through the panel, inwardly directed forces applied to the flanges are transmitted from the flanges to the central structure of the shank which then deforms into the cored-out sections thereof so as to lower the force required to insert the fastener into the bore formed through the panel.

8. The fastener of claim 7 wherein the head comprises at least one flange secured to the base end of the central structure of the shank in generally perpendicular relation thereto.

9. The fastener of claim 7 wherein the head of the fastener comprises a laterally extending lip that is biased toward the shank of the fastener.

10. The fastener of claim 7 wherein the head comprises a connecting structure constructed and arranged to be removably received and retained in a doghouse.

11. The fastener of claim 10 wherein the head of the fastener also comprises a laterally extending lip that is biased toward the shank of the fastener.

* * * * *